July 18, 1950  A. L. M. A. ROUY  2,515,799
RESILIENT DIAPHRAGM ENGINE BEARING
Filed Feb. 8, 1945
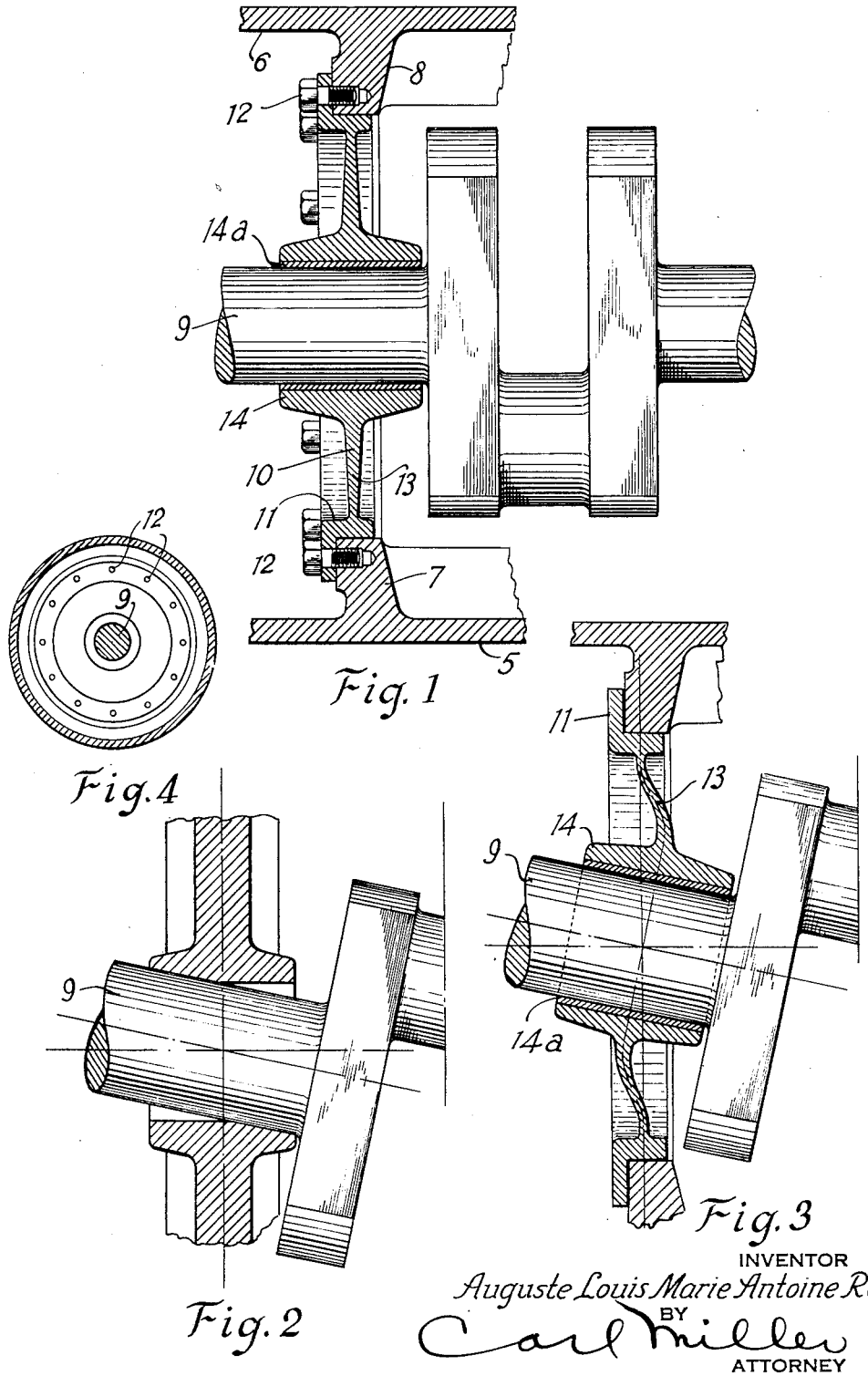
INVENTOR
Auguste Louis Marie Antoine Rouy
BY
Carl Miller
ATTORNEY Patented July 18, 1950

2,515,799

UNITED STATES PATENT OFFICE 2,515,799

RESILIENT DIAPHRAGM ENGINE BEARING

Auguste Louis Marie Antoine Rouy,
New York, N. Y.

Application February 8, 1945, Serial No. 576,746

1 Claim. (Cl. 308—26)

This invention relates to an improved engine bearing and one of its objects is to provide an engine bearing with a resilient diaphragm, which will maintain the engine shaft in true concentric driving relation to the bearing and prevent the distortion of the bearing under transversal torque of the shaft.

Another object of the invention is to provide a resilient diaphragm engine bearing, which will have an insignificant yield under radial pressures transmitted by the engine shaft to the bearing, so as to provide maximum radial rigidity under working loads, but which will yield under lower loads or pressures, when the engine shaft is displaced from its normal right angular relation to the transverse axis of the bearing, so that the bearing itself will conform to the position assumed by the shaft when displaced by transversal torque, and the bearing will be thus maintained at all times in true concentric relation to the shaft, whether operating in its normal relation to the engine, or in a displaced relation to the engine, it being understood that the displacement may be small, but sufficient to develop a progressive distortion of the wall of the bearing, resulting in gradually spacing the contacting surface of the bearing from the shaft, establishing oil leaks and the concentration of working loads upon restricted masses of the bearing.

With the above and other objects in view, the invention relates to certain new and useful constructions, combinations and arrangements of parts, clearly described in the following specification, and illustrated in the drawings, in which:

Fig. 1 is a vertical sectional view through an engine end or main bearing, embodying my invention.

Fig. 2 is a fragmentary sectional view, illustrating the deformation which develops on a bearing when the shaft is displaced from its normal concentric turning relation therewith, greatly exaggerated.

Fig. 3 is a similar view, illustrating the resilient action of my improved bearing, under the transversal torque of a displaced engine shaft, so that the bearing is maintained in concentric relation to the engine shaft, shown greatly exaggerated.

Fig. 4 is a side elevation of the diaphragm and the crank case ring flange.

Referring to the accompanying drawings, which illustrate my invention, as applied to an engine shaft, 5 designates a portion of the bottom wall of a crank case, and 6 a portion of the upper wall of the crank case.

The bottom wall 5 of the crank case is provided with an integral circular flange 7, and the upper wall 6 of the crank case is provided with an integral circular flange 8, which is arranged in alignment with the flange 7, to provide a continuous internal ring flange, disposed at right angles to the main horizontal axis of the engine shaft 9.

On the flange ring provided by the flange sections 7 and 8, my improved resilient diaphragm bearing 10 is mounted. This diaphragm bearing is provided with an L-shaped ring 11 which is bolted directly to the flange sections 7 and 8 by means of the bolts 12, which are spaced equally from each other. A diaphragm section 13 is formed integral with the annular ring 11, and a bearing 14 is formed integral with the diaphragm section 13, and disposed in true concentric relation to this section and to the ring 11. The bearing 14 is provided with the usual bearing lining 14a, and is shown to extend equal distances on each side of the diaphragm section 13.

The diaphragm section 13 decreases in thickness from the point of its union with the bearing 14 to the point of its union with the external coupling ring 11, having its minimum thickness adjacent to the external ring 11. The diaphragm section 13 is centered with reference to the ring 11 and the flange sections 7 and 8, so that radial thrusts imposed on the bearing 14 will be transmitted directly to the flange sections 7 and 8.

The diaphragm is tapered as shown to prevent crystallization under fatigue stresses. It has been established by intensive laboratory studies, aided by polarized light studies in loaded plastic materials, by X-rays of metal structures under stress, and by measurement of behavior of metals subjected to magnetic hysteresis and alternate bending and flexion stresses, that metals and materials will crystallize readily within the region of maximum stresses and will break when these stresses are not equal at all points of the bending or flexing material or member.

It is also established that when stresses occur throughout a flexible or bending member of equal intensity, local crystallization does not develop and breaking of structure will not take place.

Applicant has applied the results of his research work to develop the structure of the diaphragm, so that the load stresses are equally distributed throughout the mass of the diaphragm. This is done by decreasing the thickness of the diaphragm from the inner bearing element to the outer bearing element, and using throughout an imperforate structure.

It is well known that it is extremely difficult to maintain both ends of a shaft or the whole shaft in sustained concentric rotation, under working loads, and that transversal displacements of portions of the shaft from true concentric position, take place. The crank shafts of internal combustion engines are subject to the pressure strokes of a series of power pistons, which are successively impelled by explosive charges, and therefore subject the crank shaft to transversal loads applied at different times and upon different sections of the crank shaft, through the crank throws of the shaft.

Engine bearings under these conditions develop deformations of their inner bearing surfaces, under the influence of engaged shaft portions, which have been transversely displaced. When the engine shaft is forced out of its true concentric relation with the bearing it turns it, no matter how small may be this displacement, the wall of the bearing is also forced out of true cylindrical condition, and the ends of the bearings are opened out or enlarged, giving the wall of the bearing a slightly flared out condition.

When this condition develops in an engine bearing the lining of the bearing is spaced from the shaft, thus opening up oil leaks from the crank case, and the supporting or load carrying area or mass of the bearing is reduced in proportion as the wall of the bearing is deformed from a true cylindrical condition. When this condition develops the engine shaft has a tendency to drop in its bearings, and this in turn effects the compression and force of the explosion against the piston. The more the bearing is distorted the greater is the loss of efficiency of the engine, and the greater becomes the displacement of the crank shaft.

A shaft bearing functions best when it continues to maintain a true concentric relation with the shaft, and wears equally throughout its load bearing area, so that the shaft is uniformly supported, and no relative displacement takes place.

When the shaft is forced out of its normal axis of rotation, either in part or in whole, and usually in part, lateral pressure is applied to the bearing. With my resilient diaphragm bearing, the diaphragm will yield laterally, as shown in exaggerated condition in Fig. 3, so that the bearing itself is maintained by this yielding, in true concentric relation with the portion of the shaft engaged by it.

This displacement is actually very small, but the outwardly thinned diaphragm is capable of yielding, so that the displacement of the shaft will not permanently deform the bearing, and a true concentric driving relation will be maintained.

The diaphragm has sufficient rigidity to absorb radial thrusts, and to carry the normal operating loads upon it, due to the concentric turning of the shaft of the shaft under power loads.

The effect of my improved resilient diaphragm engine bearing is to maintain the efficiency of the engine, reduce oil and power losses, and prevent engine noises resulting from structural displacements, as explained.

It is understood that various changes in the details of construction, their arrangement and combination, and in the substitution of materials, may be resorted to, within the scope of the invention, as defined in the claim hereof.

Having described my invention, I claim as new:

A bearing for an engine comprising a sleeve bearing portion, a diaphragm portion integral with the center of the sleeve bearing portion extending radially therefrom and an attaching ring portion of L-shape integrally united with the outer periphery of the diaphragm portion, a crankcase having a flange ring, the radially disposed part of the L-shaped ring being secured to said flange ring, the said diaphragm portion decreasing in thickness from its point of union with the bearing sleeve portion to its point of union with the attaching ring portion and having its minimum thickness adjacent the attaching ring portion whereby the stresses at all points along a radius is proportioned.

AUGUSTE LOUIS MARIE ANTOINE ROUY.

REFERENCES CITED

The following references are of record in the file of this patent:

UNITED STATES PATENTS

| Number | Name | Date |
|---|---|---|
| 1,445,821 | Buck | Feb. 20, 1923 |
| 1,731,958 | Wickstrom | Oct. 15, 1929 |
| 1,923,892 | Skillman | Aug. 22, 1933 |
| 1,993,350 | Reece | Mar. 5, 1935 |
| 2,030,193 | Arnold | Feb. 11, 1936 |
| 2,159,545 | Bartosch | May 23, 1939 |
| 2,213,302 | Buske | Sept. 3, 1940 |
| 2,256,783 | Pigott | Sept. 23, 1941 |